June 23, 1959
F. C. WOOD
2,891,905
HYDROCARBON CONVERSION PROCESS INCLUDING REMOVAL
OF ELEMENTAL SULFUR BY WATER WASHING
Filed Sept. 30, 1954
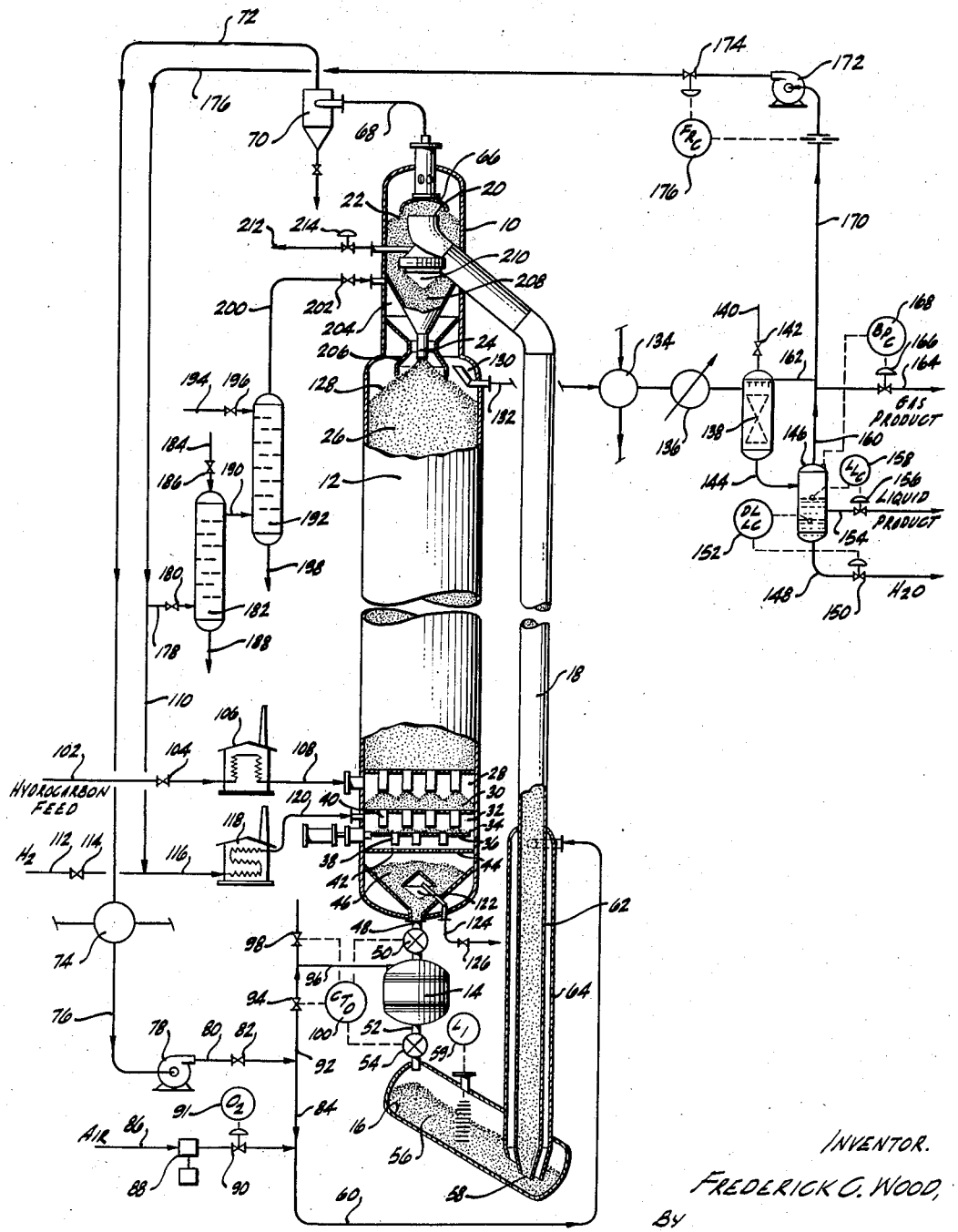
INVENTOR.
FREDERICK C. WOOD,
BY
AGENT.

United States Patent Office 2,891,905
Patented June 23, 1959

2,891,905

HYDROCARBON CONVERSION PROCESS INCLUDING REMOVAL OF ELEMENTAL SULFUR BY WATER WASHING

Frederick C. Wood, Long Beach, Calif., assignor to Union Oil Company of California, Los Angeles, Calif., a corporation of California Application September 30, 1954, Serial No. 459,431

14 Claims. (Cl. 208—136)

This invention relates to the conversion or treating of hydrocarbons with a granular solid contact material and particularly relates to the catalytic desulfurization, with or without the simultaneous catalytic aromatization or reforming of naphthas, and to the catalytic desulfurization of the heavier gas-oil fractions of hydrocarbons such as those derived from petroleum. Specifically this invention relates to an improved process for the treating of hydrocarbon fractions in the presence of a solid granular catalyst and hydrogen to desulfurize such hydrocarbons and includes novel steps for treating the conversion zone effluent immediately before removal from the catalyst bed and also immediately after contact with the catalyst to produce a usually stable and sulfur-free hydrocarbon product which exhibits an apparent inhibition against reactions of unknown character which cause the effluent to become sour and corrosive during subsequent treating and redistillation operations or storage, or both.

Hydrocarbon fractions, usually derived from petroleum, and boiling from about 75° F. to as high as 750° F. and higher and including the so-called naphtha and gas-oil fractions are used to prepare automotive and aircraft internal combustion fuels. These hydrocarbons in their natural state frequently contain excessive and detrimental amounts of hydrocarbon derivatives of sulfur and in some cases these derivatives exist in such greater quantities that the sulfur analysis runs as high as 5% by weight. The presence of these compounds is undesirable because of their adverse effect both upon such hydrocarbon refining techniques as catalytic cracking as well as upon fuel combustion within the internal combustion engine. Various refining techniques have been devised to desulfurize these hydrocarbons so that the gasoline, diesel, and jet engine fuels produced therefrom will not exceed the maximum sulfur specifications. Such refining steps have in the past included sulfuric acid treating, clay treating, contact with catalysts in the presence of hydrogen, and others. Probably the best known and most effective catalytic treatment involves contact of the hydrocarbon with an alumina supported cobalt molybdate catalyst at pressures ranging from about 50 p.s.i.g. to about 2500 p.s.i.g., at temperatures ranging from about 500° F. to about 900° F., at liquid hourly space velocities (LHSV) of from about 0.2 to about 10.0 volumes of oil per volume of catalyst per hour, and in the presence of between about 50 and about 10,000 standard cubic feet (s.c.f.) of recycled hydrogen per barrel of hydrocarbon. In such a process the hydrocarbon derivatives of sulfur are catalytically decomposed and hydrogenated to produce hydrogen sulfide and a saturated hydrocarbon fragment so that the product contains generally less than about 0.01% by weight of sulfur. The liquid yield of this process is often 100% by volume or more.

Even with such an effective catalytic treatment it is sometimes found that although the reactor effluent is sweet and noncorrosive, the finished product following stabilization and/or rerunning, and sometimes after storage, is found to be sour and corrosive. To avoid this problem, refiners have resorted to the incorporation of chemical inhibitors in the hydrocarbon product following removal of the effluent from the reaction zone.

The present invention is directed to an improved catalytic hydrocarbon conversion process in which a hydrocarbon stream contaminated with hydrocarbon derivatives of sulfur is catalytically desulfurized either alone or simultaneously or with other hydrocarbon conversions such as aromatization or reforming, and which includes several novel steps whereby the hydrocarbon effluent from such a catalytic conversion process is not only substantially free of the original hydrocarbon compounds of sulfur but also exhibits characteristics indicating that it is inhibited against becoming sour and corrosive during subsequent distillation and/or storage without the use of expensive chemical inhibitors.

It is accordingly a primary object of this invention to provide an improved hydrocarbon conversion process for the treatment of hydrocarbons containing hydrocarbon derivatives of sulfur whereby the effluent is prevented from further reaction and from becoming sour and corrosive following the catalytic step.

It is a specific object of this invention to provide in a catalytic desulfurization process for the pretreatment of regenerated desulfurization catalysts with a gas containing hydrogen but which is substantially free of hydrogen sulfide to produce a regenerated pretreated catalyst which is free of entrained sulfur so that the hydrocarbon effluent, immediately prior to being disengaged from the granular catalyst bed for removal from the contacting zone, is passed through a bed of such pretreated sulfur-free catalyst so as to eliminate elemental sulfur in the raw effluent.

It is a further object of the present invention to treat the raw effluent, following cooling and partial condensation, with a stream of cool water which serves to remove any additional sulfur present in the effluent.

It is also an object of this invention to provide in a catalytic desulfurization process both of the foregoing steps to eliminate product souring during redistillation or storage.

Other objects and advantages of the present invention will become apparent to those skilled in the art as the description thereof proceeds.

Briefly the present invention comprises a process for the catalytic desulfurization of a hydrocarbon contaminated with hydrocarbon derivatives of sulfur by countercurrently contacting the hydrocarbon feed in the vapor phase with a mass of granular catalyst, preferably cobalt molybdate supported on activated alumina, at a temperature of between about 500° F., to about 1000° F., at a pressure of between about 50 p.s.i.g. and about 2500 p.s.i.g., at an LHSV of between about 0.1 and about 10.0, and in the presence of a gas containing hydrogen recycled at a rate of between about 50 s.c.f. and about 10,000 s.c.f. of hydrogen per barrel of hydrocarbon to produce a substantially completely desulfurized hydrocarbon effluent. For the simultaneous desulfurization and aromatization of a low antiknock petroleum naphtha, temperatures from 800° to 950° F., pressures from 250 to 600 p.s.i.g., and hydrogen recycle rates of from about 2000 s.c.f. to about 6000 s.c.f. per barrel. The effluent is disengaged from the granular catalyst, removed from the catalytic conversion zone, cooled and partially condensed to produce an uncondensed fraction and a liquid condensate. The uncondensed gas contains from 70 to 80% hydrogen, up to about 5% hydrogen sulfide, and the remainder is low molecular weight hydrocarbon gas. This hydrogen-containing gas is recycled in part with additional hydrogen for repassage through the reaction zone with the hydrocarbon to be desulfurized. Part of the uncondensed gas is bled from the system to prevent accumulation of hydrogen sulfide or the low molecular weight hydrocarbon gas or both. If desired, hydrogen sulfide and the hydrocarbon gas may be removed continuously from the hydrogen recycle to prevent them from building up in the system. The liquid condensate is stabilized to remove light ends and rerun to separate any heavy ends or polymers having boiling points above the desired maximum. The liquid yield on a volumetric basis is always greater than 95% and frequently exceeds 100%, in hydrocarbon desulfurization. With aromatization, yields are 90% to 97%.

Preferably, the granular catalyst is recirculated downwardly by gravity as a dense moving bed through the hydrocarbon conversion zone and then through a separate regeneration zone wherein the spent catalyst is contacted with an oxygen-containing regeneration gas which removes by combustion the hydrocarbonaceous residue deposited thereon during the hydrocarbon conversion. A suitable regeneration gas comprises a flue gas to which controlled quantities of oxygen, such as between about 0.5% and about 5.0% by volume, are added. The regeneration is controlled to remove substantially all the hydrocarbonaceous residue and to limit the maximum regeneration temperature to about 1100° F. With a cobalt molybdate catalyst in the reaction zone in the presence of hydrogen sulfide, the catalyst usually is converted at least in part to a cobalt thiomolybdate so that the catalyst contains combined sulfur. During regeneration for removal of the coke from the catalyst, the cobalt thiomolybdate is oxidized back to cobalt molybdate with the evolution of sulfur dioxide.

In the present invention this regenerated catalyst is then passed through a catalyst pretreating and reducing zone prior to its introduction into the hydrocarbon conversion zone. In the pretreating and reducing zone the oxidized regenerated catalyst is contacted with a portion of the hydrogen-containing recycle gas discussed above, but from which all of the hydrogen sulfide has been removed by first caustic washing and then water washing this part of the hydrogen-containing gas. The amount of hydrogen required in the pretreating and reducing zone may vary between about 500 s.c.f. and about 2000 s.c.f. of hydrogen per ton of catalyst. The reduction is effected at a temperature slightly above that of the regenerated catalyst and somewhat greater than the reaction temperature; that is, between about 500° F. and about 1100° F.

The thus treated catalyst is substantially completely free of both combined as well as free elemental sulfur because the combined sulfur is effectively removed by oxidation during regeneration and the use of hydrogen sulfide-free hydrogen in the reducing zone prevents the deposition of elemental sulfur on the regenerated catalyst during the reduction reaction. By introducing this reduced catalyst at the top of the catalytic desulfurization zone, that part of the catalyst bed at the top of the catalytic mass and through which the effluent hydrocarbon is disengaged and removed from the desulfurization zone contains no substantial amount of sulfur. Thus the partially converted hydrocarbon fraction being desulfurized is finally contacted with this hydrogen treated catalyst immediately prior to disengagement of the converted hydrocarbon from the granular solids bed and removal from the reaction zone. The effect of such a treatment is to substantially eliminate the entrainment and carry-over of elemental sulfur in the reactor effluent which apparently occurs when regenerated catalyst is contacted with a gas containing hydrogen sulfide.

Immediately following the removal of the hydrocarbon effluent containing the reduced quantities of elemental sulfur, it is cooled and partially condensed and is contacted directly with a stream of cool wash water. Unexpectedly, the residual amounts of elemental sulfur have been found to be hydrophilic in nature and are found to be transferred very readily from the hydrocarbon into the water phase. It has been found that between about 20 and about 100 gallons of cool water per barrel of hydrocarbon effluent is effective. The mixed stream of gas, condensed hydrocarbon, and wash water is separated by decantation. The gas phase is treated as above described, the wash water is discarded or treated to recover the sulfur as a by-product, and the liquid hydrocarbon phase is subjected to further treating operations if desired or sent to storage.

The thus treated hydrocarbon has not only been substantially completely desulfurized in that it contains substantially no (less than 0.01% by weight) hydrocarbon derivatives of sulfur, but it also contains substantially no entrained elemental sulfur. The effluent so treated has been found to remain sweet during subsequent stabilization and rerunning operations, as well as during prolonged storage without the use of added chemical inhibitors. With the combined treatment of hydrocarbon effluent with sulfur-free reduced regenerated catalyst just prior to removal from the reaction zone and with the water wash immediately following such removal, it is found that the effluent contains substantially less than 2.0 milligrams of elemental sulfur per 100 ml. With the water wash alone using about 42 gallons of water per barrel of effluent the effluent contains about 15 milligrams of elemental sulfur per 100 ml. With the sulfur-free catalyst treatment alone the effluent contains about 6 milligrams of sulfur per 100 ml. The effluent from the cobalt molybdate desulfurization with neither treatment according to this invention often contains about 25 milligrams of elemental sulfur per 100 ml., and although sweet when produced, sours rapidly and becomes corrosive during subsequent treatment.

The process of the present invention will be more clearly understood by reference to the accompanying drawing which describes one modification of a catalytic desulfurization process according to this invention in which provision is made for treating the converted hydrocarbon with a sulfur-free catalyst just prior to removal from the conversion zone and for the water washing of the effluent immediately after removal from the conversion zone.

Referring now more particularly to the drawing, the apparatus consists essentially of solids receiving and catalyst pretreating zone 10 superimposed upon catalytic conversion column 12, spent catalyst pressuring zone 14, and catalyst induction vessel 16. Extending upwardly from the low point in vessel 16 is elongated conveyance-regeneration zone 18 which discharges regenerated catalyst in the upper portion of catalyst pretreating vessel 10. The regenerated catalyst discharges from outlet opening 20 and passes downwardly as a dense moving bed 22 through pretreating zone 10. Moving bed 22 discharges through restricted outlet 24 into the upper portion of column 12 forming a moving bed 26 which passes downwardly through the conversion column in contact with a countercurrent flow of hydrocarbon and hydrogen hereinafter more fully described. The spent catalyst, partially deactivated by a hydrocarbonaceous deposit generally referred to as coke, passes downwardly successively through hydrocarbon engaging zone 28, stripping zone 30, and recycle gas engaging zone 32 in the upper portion of solids feeder zone 34. In the feeder zone a positive control over the catalyst circulation rate is maintained by means of reciprocating tray 36 containing a plurality of dependent tubes 38 which alternately are aligned with dependent tubes 40 in the recycle gas engaging zone and with apertures 42 in lower stationary tray 44. The construction and operation of these reciprocating tray solids feeders are more fully described and claimed in the Berg Patents No.

2,544,214, issued March 6, 1951, and No. 2,647,587, issued August 4, 1953.

The spent solids pass downwardly through bottom zone 46, are removed through transfer line 48 controlled by valve 50, and are discharged intermittently into solids pressuring vessel 14. Herein the spent catalyst is pressured by the injection of high pressure fluid to a pressure substantially greater than that of conversion column 12 and the pressured solids are discharged through transfer line 52 controlled by valve 54 into induction chamber 16 forming a mass of pressured spent catalyst 55 which submerges inlet opening 58 of conveyer regenerator conduit 18. Level indicator 59 serves to indicate the catalyst inventory in the system.

A conveyance regeneration gas consisting essentially of flue gas to which a controlled proportion of oxygen has been added flows through line 60 and is introduced tangentially into the upper portion of annulus 62 existing between shell 64 and the lower portion of conveyer regenerator 18. The gas passes downwardly in indirect countercurrent heat exchange relation to an upwardly moving mass of dense granular catalyst, preheats the gas and cools the regenerator wall, is injected into solids bed 56, and flows therefrom through inlet opening 58 upwardly through the dense mass of catalyst in conveyance regenerator 18. The conveyance-regeneration gas flow is controlled to be sufficient to overcome forces of gravity and friction acting on the dense catalyst mass in conduit 18 and to establish therein a pressure gradient $$\frac{dp}{dl}$$

satisfying the following equation:

$$\frac{dp}{dl} = \rho_s \cos \theta$$

wherein $$\frac{dp}{dl}$$

is the pressure gradient in pounds per square foot per foot, $\rho_s$ is the bulk density of the upwardly moving catalyst mass in pounds per cubic foot, and is substantially equal to the static bulk density of the spent catalyst when at rest, and $\theta$ is the angular deviation of the conveyance direction from a vertical upward reference axis. When the conveyance-regeneration gas flow rate is sufficient to establish $$\frac{dp}{dl}$$

defined by the equation above, the dense catalyst mass will flow upwardly through conveyance-regenerator 18 so long as the inlet remains submerged in and supplied with solids and the conveyed regenerated catalyst is removed from outlet opening 20. The granular spent catalyst is maintained as an upwardly moving mass and fluidization or suspension of the solid particles in the fluid is prevented by discharging the spent catalyst upwardly against cap 66 which effectively applies a thrust force against the discharging mass of solids and restricts the discharge therefrom without exerting any substantial restriction on the discharge of the conveyance-regeneration fluid. The discharged mass of solids then flows by gravity as a moving bed through pretreating vessel 10 into contacting column 12 as described above to complete the cycle.

By controlling the oxygen concentration in the conveyance-regeneration conduit 18, spent catalyst containing as much as 5% by weight of coke is substantially completely regenerated. It is discharged at outlet opening 20 having its original catalytic activity and containing less than 0.1% by weight of the hydrocarbonaceous material.

The spent conveyance-regeneration fluid is disengaged from the discharged solids mass 22 and contains as sensible heat the major part of the heat liberated during the regeneration. These hot gases pass through line 68 into separator 70 wherein any suspended solids are separated and the solids-free gas then passes through line 72 through heat interchanger 74. Herein the spent regeneration gas is cooled through indirect heat exchange with one of the process streams, such as the hydrocarbon feed or the cool hydrogen-containing recycle gas. The cooled gases continue through line 76 into flue gas recycle compressor 78 wherein the pressure is increased by an amount substantially equal to the pressure differential existing between inlet opening 58 and outlet opening 20 of conveyance-regenerator 18. This compressed gas then passes through line 80 controlled by valve 82 and is split into two streams. The primary and major stream flows through line 84 and is mixed with air flowing through line 86. The air is compressed in compressor 88 at a rate controlled by valve 90 and oxygen recorder controller 91 by means of which the oxygen concentration in the free conveyance-regeneration gas is controlled. The fresh regeneration gas then passes through line 60 into the regeneration zone as described above. The secondary and minor portion of the compressed flue gas recycle passes through line 92 intermittently controlled by valve 94 and through manifold 96 as the pressuring gas introduced into solids pressuring vessel 14.

In the present process, operated at a pressure of about 400 p.s.i.g., the spent granular solids are pressured in vessel 14 to a pressure of about 460 p.s.i.g., which is also the outlet pressure of flue gas recycle compressor 78. Valve 50 is opened to admit a quantity of spent catalyst at 400 p.s.i.g. and is then closed. Valve 94 is then opened to admit sufficient of the secondary spent flue gas to raise the pressure of vessel 14 to about 460 p.s.i.g. and is then closed. Solids outlet valve 54 is then opened to discharge the pressured solids into induction vessel 16 and is then closed. Valve 98 is then opened and fluids are depressured from vessel 14 causing the pressure therein to drop to about 400 p.s.i.g. and is then closed. Solids inlet valve 50 is then reopened to admit additional spent catalyst and the solids pressuring cycle is repeated. Cycle timer operator 100 controls the operation of valves 50, 54, 94, and 98 in the sequence described at a rate sufficient to pressure the solids at the same rate set by the catalyst feeder tray 36 described above.

In the present process, a naphthenic hydrocarbon flows at the rate of about 1100 barrels per day through line 102 controlled by valve 104 through preheater and vaporizer 106. The temperature is raised to about 900° F. and the naphtha vapor is passed through line 108 into hydrocarbon engaging zone 28 from which it passes upwardly countercurrent to the downwardly moving granular cobalt molybdate catalyst.

A recycle gas containing hydrogen flows through line 110, is combined with make-up hydrogen flowing through line 112 controlled by valve 114, and the mixture passes through line 116 into recycle gas heater 118. The hot hydrogen-containing recycle gas is introduced through line 120 into recycle gas engaging zone 32 from which it passes upwardly at a rate of 4120 M s.c.f./d. countercurrent to the spent catalyst in hydrocarbon stripping zone 30 wherein its acts as a stripping gas to desorb residual quantities of hydrocarbon from the spent catalyst. The desorbed hydrocarbon and the hydrogen recycle join the fresh hydrocarbon feed vapor in engaging zone 28 and pass upwardly therewith countercurrently to the moving catalyst bed 26.

A small portion of the hydrogen recycle gas passes downwardly from engaging zone 32 and joins a small stream of spent flue gas passing upwardly through solids transfer line 48 from pressuring vessel 14. These two streams are mixed in lower seal gas disengaging zone 122 and are removed therefrom through line 124 controlled by valve 126 at a rate of 140 M s.c.f./d.

The reactant mixture of naphtha and recycle gas is disengaged through solids interface 128 at the top of contacting column 12, collects in effluent disengaging zone 130, and is removed therefrom through line 132. The effluent is passed through heat interchanger 134 in which heat is recovered by indirect heat exchange with either the fresh naphtha feed or the cool recycle hydrogen, and is then further cooled and condensed in cooler 136. The partially condensed effluent is then introduced into water washing column 138 into which is injected a flow of wash water flowing through line 140 controlled by valve 142 at a rate of between about 20 and 100 gallons per barrel of liquid effluent. Herein a highly effective transfer of hydrophilic elemental sulfur from the liquid hydrocarbon to the liquid water is effected. The mixed liquid phases pass through line 144 into product separator 146. The wash water is removed from the bottom thereof through line 148 at a rate controlled by valve 150 actuated by differential liquid level controller 152. The desulfurized and elemental sulfur-free naphtha product is removed therefrom through line 154 at a rate controlled by valve 156 which is actuated by liquid level controller 158.

The uncondensed fraction, consisting essentially of hydrogen and also containing small but significant amounts of hydrogen sulfide and low molecular weight hydrocarbon gases, is removed from separator 146 through line 160. A pressure equalizing line 162 opens into the upper portion of wash column 138. A small portion of this gas is bled from the system through line 164 at a rate controlled by valve 166 in accordance with back pressure controller 168.

The remaining recycle gas passes through line 170 under the influence of hydrogen recycle gas blower 172 at a rate of about 3700 M s.c.f. per barrel of naphtha controlled by valve 174 actuated by flow recorder controller 176. This hydrogen recycle gas then passes through line 176 and is split into a major portion which passes on through line 110 previously described and a minor portion which is employed to pretreat the regenerated catalyst in pretreating zone 10.

This minor portion of recycle hydrogen passes through line 178 at a rate of between about 500 s.c.f. and about 2000 s.c.f. per ton of spent catalyst controlled by valve 180 to primary extraction column 182. Herein the minor portion of hydrogen is countercurrently contacted by an alkaline solvent such as aqueous caustic solution, such as sodium or potassium hydroxide or the like, so as to effect a substantially complete removal of hydrogen sulfide. The caustic solution is introduced through line 184 at a rate controlled by valve 186 and is removed from column 182 through line 188.

The hydrogen sulfide-free hydrogen stream then passes through line 190 into secondary extraction column 192 wherein it is countercurrently contacted by a stream of water introduced thereinto through line 194 at a rate controlled by valve 196 and is removed therefrom through line 198.

The hydrogen sulfide-free hydrogen stream thus produced flows through line 200 controlled by valve 202 and is introduced into pretreating gas engaging zone 204 from which it flows downwardly into direct contact with the pretreated regenerated catalyst at the apex of catalyst bed 26. A first portion of this gas flows around the lower periphery of baffle 206 and combines with the reactor effluent collecting in disengaging zone 130 described above. This prevents upflow of hydrogen and naphtha into pretreating zone 10. The remaining portion of hydrogen passes upwardly through throat 24 countercurrently to the downflowing mass of regenerated catalyst in moving bed 208 and at a rate determined by the setting of valve 214. Herein the oxidized regenerated catalyst is reduced by hydrogen in the absence of hydrogen sulfide whereby a reduced regenerated sulfur-free catalyst is produced. This catalyst is discharged directly into the upper portion of contacting column 12.

The upper portion of moving bed 26 thus consists of a sulfur-free regenerated reduced catalyst which contacts the effluent just prior to its disengagement from the catalyst and removal from the system. A very substantial reduction in the elemental sulfur content of the effluent is achieved. This effluent then passes by means of line 132 through the cooling and partial condensation and water washing system described before to remove last traces of sulfur.

The stream of pretreating hydrogen passes upwardly and accumulates in pretreating gas disengaging zone 210 from which it is removed, together with a minor portion of spent regeneration gas passing downwardly through catalyst bed 22, and is removed as a seal gas through line 212 at a rate controlled by valve 214.

In the experimental verification of the process of this invention using a cobalt molybdate catalyst supported on silica stabilized alumina, a naphtha hydrocarbon containing 0.8% by weight of combined sulfur was passed at a temperature of 900° F. and at a liquid hourly space velocity of 1.0 and a pressure of 400 p.s.i.g. through a catalytic desulfurization and aromatization zone as described above.

*Example I*

When the oxidized regenerated catalyst was reduced with untreated hydrogen recycle gas containing about 1.5% by volume of hydrogen sulfide and the effluent hydrocarbon was cooled and condensed in the absence of water washing, the effluent analyzed 0.008% by weight combined sulfur and contained about 25 milligrams elemental sulfur per 100 ml. and it was found that during subsequent redistillation and stabilization operations the product became sour and corrosive although it exhibited no such characteristics when tested immediately after removal from the reactor.

*Example II*

When the process of Example I was carried out together with the additional step of water washing the condensed effluent as described with about 42 gallons of water per barrel of naphtha effluent, the elemental sulfur content of the naphtha product was decreased to about 15 milligrams per 100 ml. and the combined sulfur present analyzed 0.008% by weight as before.

*Example III*

When the same process was carried out as in Example I together with the pretreatment of the catalyst with 800 s.c.f. of hydrogen sulfide-free recycle gas per ton of catalyst, the combined sulfur in the effluent analyzed 0.008% by weight and the elemental sulfur present therein was found to be 6 milligrams per 100 ml.

*Example IV*

When the process of Example I was carried out in combination with reduction or pretreatment of the regenerated catalyst with hydrogen sulfide-free recycle gas as in Example III and the effluent was immediately washed with water following cooling and condensation as in Example II the product was found to contain only 2.0 milligrams of elemental sulfur per 100 ml., it exhibited no corrosive tendencies during redistillation or storage and remained sweet following production.

It is apparent that the combination of these two processing steps, namely treating the effluent with a bed of elemental sulfur-free cobalt molybdate catalyst immediately prior to disengaging the effluent from the catalyst bed and the step of water washing the effluent immediately following partial condensation thereof, effectively inhibits the effluent against equipment corrosion and subsequent degradation during processing or storage. The effluent thus remains sweet and the corrosion and sourness problems previously noted as in Example I are eliminated.

It is to be noted however that substantial reductions in the elemental sulfur content of the conversion zone effluent are achieved by either step individually and that in some cases, particularly in those in which the naphtha treated does not contain such excessive quantities of combined sulfur, either one or the other of the effluent water washing or pure hydrogen reduction steps will be sufficient to provide adequate inhibition of the product.

The chemical mechanisms through which the hydrocarbon effluent of Example I becomes sour during post treating or storage are not clearly understood, but it has been determined that the presence of elemental sulfur in the effluent appears to bear relation to the occurrence of these undesirable results. It is possible that the hydrogen sulfide in the recycle gas reacts either in the pretreating zone when raw recycle gas is used, or at the top of the catalytic conversion zone when no pretreating step is employed, to sulfurize the catalyst and liberate free sulfur which may be partially entrained in the effluent. This entrained sulfur possibly reacts with various hydrocarbon constituents of the effluent either at the temperatures of product redistillation or during prolonged storage to produce sulfur derivatives rendering the effluent sour and corrosive even though it was sweet and noncorrosive when removed from the conversion zone.

Regardless of the actual reactions involved, it has been found unexpectedly that the hydrogen pretreatment of the catalyst in the absence of hydrogen sulfide effects a substantial reduction in these adverse characteristics of the product and it has been also unexpectedly found that whatever entrained sulfur may remain in the effluent appears to have a hydrophilic nature permitting a substantial removal thereof by water washing the effluent after condensation. It has further been unexpectedly found that while approximately 40% reduction in elemental sulfur may be achieved through water washing and that an approximately 75% reduction can be achieved through pure hydrogen pretreatment, a combination of both steps as in the process of this invention effects better than 95% removal of elemental sulfur and renders the product sweet and noncorrosive during indefinite storage times as well as during redistillation at elevated temperatures.

The present invention has been found to be applicable to the desulfurization of gas-oil fractions as well as to the simultaneous desulfurization and aromatization of napthenic gasoline fractions contaminated with hydrocarbon derivatives of sulfur. It has also been found that these same effects may be obtained during the catalytic treatment of hydrocarbon fractions contaminated with sulfur compounds in the presence of catalysts containing molybdate trioxide, cobalt oxide, nickel oxide, and iron oxide, as well as processes in which a cobalt molybdate catalyst is used.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a process for the conversion of hydrocarbons contaminated with organic sulfur compounds, wherein the hydrocarbon plus added hydrogen is contacted countercurrently with a moving bed of solid granular hydrocarbon conversion catalyst in a conversion zone maintained at conversion conditions of pressure and temperature to produce a spent catalyst and an effluent hydrocarbon of improved characteristics, and wherein said spent catalyst is regenerated by oxidation prior to contacting further hydrocarbon, said catalyst in its fresh state comprising as an essential active ingredient an oxide of at least one metal selected from the class consisting of molybdenum, cobalt, nickel and iron, the improved method of eliminating corrosive sulfur from said hydrocarbon effluent which comprises contacting the regenerated catalyst at a temperature between about 500° and 1100° F. with a stream of hydrogen sulfide-free hydrogen to effect reduction without producing elemental sulfur, then without further treatment immediately contacting said regenerated and reduced catalyst with said hydrocarbon in said conversion zone, whereby the hydrocarbon passing therethrough contacts said freshly regenerated and reduced catalyst immediately prior to the removal of said hydrocarbon effluent therefrom, cooling the resulting effluent to effect at least partial condensation, and then contacting said effluent with cool wash water to extract therefrom residual quantities of elemental sulfur, whereby the resulting hydrocarbon product does not become sour and corrosive during subsequent redistillation or storage.

2. A process as defined in claim 1 wherein said catalyst consists essentially of a minor proportion of cobalt oxide plus molybdenum oxide supported on a carrier which is predominantly activated aluminum.

3. In a process for the conversion of hydrocarbons contaminated with hydrocarbon derivatives of sulfur which comprises recirculating a hydrocarbon conversion catalyst through a conversion zone as a downwardly moving bed and through a catalyst regeneration zone, maintaining hydrocarbon conversion conditions of temperature, pressure, and composition in said conversion zone, passing said hydrocarbon plus added hydrogen therethrough countercurrent to said moving bed to form a converted hydrocarbon as a conversion zone effluent and spent catalyst, and contacting said spent catalyst in said regeneration zone with an oxygen-containing gas to regenerate said catalyst said catalyst in its fresh state comprising as an essential active ingredient an oxide of at least one metal selected from the class consisting of molybdenum, cobalt, nickel and iron, the improvement in inhibiting said effluent against subsequent souring and acquisition of corrosive characteristics which comprises in combination therewith the steps of passing regenerated catalyst from said regeneration zone through a pretreating zone, contacting the said catalyst therein with a stream of hydrogen-sulfide free hydrogen at a rate of from about 500 s.c.f. to about 2000 s.c.f. per ton of catalyst, then introducing the thus treated catalyst directly and without further treatment into said conversion zone whereby the hydrocarbon passing therethrough contacts said freshly treated catalyst immediately prior to removal of said hydrocarbon therefrom as said conversion zone effluent, cooling and at least partially condensing said effluent, directly contacting the condensate phase with between about 20 gallons and about 100 gallons of cool water per barrel of condensate, and separating from said water a washed hydrocarbon condensate having a reduced tendency to become sour and corrosive during subsequent treatment or storage.

4. A process according to claim 3 wherein a hydrogen recycle gas is passed with said hydrocarbon through said hydrocarbon conversion zone and remains as an uncondensed gas following cooling and partial condensation of said conversion zone effluent, in combination with the steps comprising contacting part of said uncondensed hydrogen gas with an alkaline solvent to remove substantially all hydrogen sulfide therefrom, and introducing the hydrogen gas thus obtained into said catalyst pretreating zone.

5. A process according to claim 4 wherein said catalyst comprises cobalt molybdate supported on activated alumina.

6. A process according to claim 5 wherein said hydrocarbon is a low antiknock petroleum naphtha to be simultaneously desulfurized and aromatized, said conversion zone is maintained at a temperature between about 800° F. and about 950° F. and at a pressure between about 250 p.s.i.g. and about 600 p.s.i.g., and between about 2000 s.c.f. and about 6000 s.c.f. of hydrogen recycle gas per barrel are passed through said conversion zone with said naphtha.

7. In a process for the conversion of hydrocarbons contaminated with hydrocarbon derivatives of sulfur which comprises passing said hydrocarbon as a vapor admixed with from about 50 s.c.f. to about 10,000 s.c.f. of hydrogen over a moving bed of cobalt molybdate catalyst at a temperature between about 500° F. and about 1000° F. and at a pressure between about 50 p.s.i.g. and about 2500 p.s.i.g. through a reaction zone to produce a desulfurized hydrocarbon effluent and a spent catalyst, cooling and at least partially condensing said effluent to separate a hydrocarbon condensate from an uncondensed recycle gas containing hydrogen and hydrogen sulfide, passing said spent catalyst through a regeneration zone in contact with a gas containing oxygen to produce an oxidized regenerated catalyst, and returning said catalyst for reuse in said conversion zone, the improvement which comprises in combination therewith the steps of passing regenerated catalyst from said regeneration zone through a catalyst pretreating zone into said reaction zone, contacting a part of said uncondensed recycle gas with an alkaline solvent to remove substantially all of said hydrogen sulfide therefrom, then contacting the hydrogen sulfide-free gas with water to absorb traces of solvent leaving hydrogen unabsorbed, passing the unabsorbed hydrogen at a rate of from about 500 s.c.f. to about 2000 s.c.f. per ton of catalyst countercurrently through said pretreating zone to reduce said regenerated catalyst in the absence of hydrogen sulfide and prevent deposition of elemental sulfur thereon, passing the thus treated catalyst directly and without further treatment into the top of said reaction zone whereby said freshly treated catalyst contacts the naphtha and hydrogen passing through said reaction zone just prior to its removal as an effluent therefrom and substantially reduces the amount of elemental sulfur therein, and contacting said hydrocarbon condensate with between about 20 gallons and about 100 gallons of water per barrel of condensate so as to absorb a substantial portion of residual traces of elemental sulfur from said condensate to produce a hydrocarbon product having a reduced tendency to become sour or corrosive during subsequent distillation treatment or storage.

8. In a process for the conversion of hydrocarbons contaminated with organic sulfur compounds wherein the hydrocarbon plus added hydrogen is contacted countercurrently with a downwardly moving bed of solid granular hydrocarbon conversion catalyst under conversion conditions of pressure and temperature to produce a spent catalyst and an effluent hydrocarbon of improved characteristics, and wherein said spent catalyst is regenerated by oxidation and reduced with hydrogen in a pretreating zone prior to contacting further hydrocarbon, said catalyst in its fresh state comprising as an essential active ingredient an oxide of at least one metal selected from the class consisting of molybdenum, cobalt, nickel and iron, the improved method for reducing the tendency of the effluent hydrocarbon to become sour or corrosive during subsequent treatment which comprises in combination with the foregoing the steps of (1) separating a hydrogen-rich recycle gas from said effluent, (2) contacting a portion of said recycle gas with an alkaline solvent to produce a pretreating gas rich in hydrogen but substantially free of hydrogen sulfide, (3) contacting the regenerated catalyst in said pretreating zone with said pretreating gas at a temperature between about 500° and 1100° F., and then (4) without further treatment contacting said catalyst with said hydrocarbon in said conversion zone whereby the hydrocarbon passing therethrough contacts said freshly regenerated and reduced catalyst immediately prior to its removal therefrom as effluent.

9. A process as defined in claim 8 wherein said catalyst consists essentially of a minor proportion of cobalt oxide plus molybdenum oxide supported on a carrier which is predominantly activated aluminum.

10. In a process for the conversion of hydrocarbons contaminated with hydrocarbon derivatives of sulfur including the steps of passing said hydrocarbon as a vapor admixed with from about 50 s.c.f. to about 10,000 s.c.f. of hydrogen countercurrently through a moving bed of cobalt molybdate catalyst at a temperature between about 500° and about 1000° F., and at a pressure between about 50 p.s.i.g. and about 2500 p.s.i.g. through a reaction zone to produce a desulfurized hydrocarbon effluent and a spent catalyst, cooling and at least partially condensing said effluent to separate a hydrocarbon condensate from an uncondensed recycle gas containing hydrogen and hydrogen sulfide, passing said spent catalyst through a regeneration zone in contact with a gas containing oxygen to produce an oxidized regenerated catalyst, and returning said catalyst for reuse in said conversion zone, the improvement which comprises (1) passing regenerated catalyst from said regeneration zone through a catalyst pretreating zone and then directly and without further treatment into said reaction zone, (2) contacting a part of said uncondensed recycle gas with an alkaline solvent to remove substantially all of said hydrogen sulfide therefrom, (3) contacting the hydrogen sulfide-free gas with water to absorb traces of solvent leaving hydrogen unabsorbed, (4) passing the unabsorbed hydrogen at a temperature between about 500° and 1100° F. through said pretreating zone to reduce said regenerated catalyst in the absence of hydrogen sulfide and prevent deposition of elemental sulfur thereon, whereby the thus-treated catalyst contacts the naphtha and hydrogen passing through said reaction zone just prior to its removal as an effluent therefrom so as to substantially reduce the amount of elemental sulfur therein.

11. In a process for the conversion of hydrocarbons contaminated with organic sulfur compounds wherein the hydrocarbon plus added hydrogen is contacted with a freshly regenerated and reduced hydrocarbon conversion catalyst in a conversion zone maintained at conversion conditions of pressure and temperature to produce a spent catalyst and an effluent hydrocarbon of improved characteristics, said catalyst in its fresh state comprising as an essential active ingredient an oxide of at least one metal selected from the class consisting of molybdenum, cobalt, nickel and iron, the improvement in reducing the tendency of the effluent hydrocarbon to become sour or corrosive during subsequent treatment which comprises in combination with the foreseeing the steps of (1) cooling and at least partially condensing the effluent from said conversion zone, and (2) immediately contacting said partially condensed effluent with a stream of cool wash water to extract therefrom residual quantities of elemental sulfur, whereby the thus treated hydrocarbon does not become sour or corrosive during subsequent redistillation or storage.

12. A process as defined in claim 11 wherein said catalyst consists essentially of a minor proportion of cobalt oxide plus molybdenum oxide supported on a carrier which is predominantly activated aluminum.

13. A process as defined in claim 11 wherein said catalyst is regenerated with an oxygen-containing gas and is then reduced with a hydrogen-containing gas at a temperature between about 500° and 1100° F. immediately prior to the contacting thereof with said hydrocarbon.

14. A process as defined in claim 13 wherein said reducing gas is substantially free of hydrogen sulfide.

References Cited in the file of this patent

UNITED STATES PATENTS

| | | |
|---|---|---|
| 1,587,649 | Johansen | June 8, 1926 |
| 1,985,955 | Snyder | Jan. 1, 1935 |
| 2,394,751 | Cole | Feb. 12, 1946 |
| 2,409,690 | Nichols et al. | Oct. 22, 1946 |
| 2,413,312 | Cole | Dec. 31, 1946 |
| 2,687,983 | Garwood | Aug. 31, 1954 |
| 2,695,866 | McGrath | Nov. 30, 1954 |
| 2,700,015 | Joyce | Jan. 18, 1955 |